United States Patent
Natsume

(10) Patent No.: US 8,405,336 B2
(45) Date of Patent: Mar. 26, 2013

(54) WIPER SYSTEM AND WIPER CONTROL METHOD

(75) Inventor: Takashi Natsume, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 533 days.

(21) Appl. No.: 12/654,694

(22) Filed: Dec. 29, 2009

(65) Prior Publication Data
US 2010/0175216 A1    Jul. 15, 2010

(30) Foreign Application Priority Data

Jan. 9, 2009   (JP) .................................... 2009-3387
Nov. 25, 2009  (JP) ............................... 2009-268037

(51) Int. Cl.
*H02P 1/04* (2006.01)

(52) U.S. Cl. ........ 318/444; 318/280; 318/286; 318/266; 318/466

(58) Field of Classification Search .................. 318/444, 318/445, 466, 280, 721, 799, 599, 400.01, 318/560, 266, 443, 286; 307/10.1; 15/250.13; 200/19.07
See application file for complete search history.

(56) References Cited

U.S. PATENT DOCUMENTS

| | | | | |
|---|---|---|---|---|
| 4,544,870 A * | 10/1985 | Kearns et al. | ................. | 318/444 |
| 5,355,061 A * | 10/1994 | Forhan | .......................... | 318/443 |
| 6,177,775 B1 * | 1/2001 | Bruington et al. | ............ | 318/443 |
| 6,249,098 B1 * | 6/2001 | Miyazaki et al. | ............. | 318/280 |
| 6,917,173 B2 * | 7/2005 | Takagi | .......................... | 318/444 |

FOREIGN PATENT DOCUMENTS

| | | |
|---|---|---|
| JP | U-61-129657 | 8/1986 |
| JP | A-2-99448 | 4/1990 |
| JP | A-2005-225457 | 8/2005 |

* cited by examiner

*Primary Examiner* — Antony M Paul
(74) *Attorney, Agent, or Firm* — Posz Law Group, PLC

(57) ABSTRACT

A wiper is pivotably supported and is swung by a drive force of an electric motor. When a command, which commands execution of one of high and low speed modes, is entered through a wiper switch in the middle of operation of the wiper in another one of the high and low speed modes, a control unit controls an electric motor such that a moving speed of the wiper, which is preset for the another one of the high and low speed modes, is changed to the moving speed of the wiper, which is preset for the one of the high and low speed modes, during a time period of executing a predetermined number of swings of the wiper between an upper return position and a lower return position upon entering of the command through the wiper switch means.

13 Claims, 10 Drawing Sheets

WIPER SYSTEM AND WIPER CONTROL METHOD

CROSS REFERENCE TO RELATED APPLICATION

This application is based on and incorporates herein by reference Japanese Patent Application No. 2009-3387 filed on Jan. 9, 2009 and Japanese Patent Application No. 2009-268037 filed on Nov. 25, 2009.

BACKGROUND OF THE INVENTION

1. Field of the Invention

The present invention relates to a wiper system and a wiper control method.

2. Description of Related Art

Rain droplets, which adhere to a front glass of a vehicle (e.g., an automobile), may reduce a visibility of a front view of a driver through the front glass. In order to avoid the reduction in the visibility, a wiper system is provided. In such a wiper system, a wiper is reciprocally swung over the front glass in response to rotation of a wiper motor to wipe the rain droplets adhered to the front glass.

In one such wiper system, the driver of the vehicle may manipulate a wiper switch to change an operational mode of the wiper among multiple operational modes, so that the rotational speed of the wiper motor is changed to change the moving speed of the wiper. The operational modes of the wiper include, for example, a high speed mode and a low speed mode. In the high speed mode, the wiper is reciprocally swung at the high speed. In the low speed mode, the wiper is reciprocally swung at the low speed.

Japanese Unexamined Patent Publication No. 2005-225457A recites a technique, which limits a rapid change in the moving speed of the wiper at the time of changing the operational mode between the high speed mode and the low speed mode. Specifically, Japanese Unexamined Patent Publication No. 2005-225457A recites a wiper system, which includes a link mechanism that converts rotation of a wiper motor in a single rotational direction into reciprocal swing movement of the wiper. When the operational mode is changed from the high speed mode to the low speed mode, the rotational speed of the wiper motor is progressively reduced. In contrast, when the operational mode is changed from the low speed mode to the high speed mode, the rotational speed of the wiper motor is progressively increased.

There is also known another type of wiper system, in which a wiper motor is designed to rotate in a forward direction and a backward direction to reciprocally drive the wiper between an upper return position and a lower return position.

In this type of wiper system, the rotational speed of the wiper motor in the forward or backward rotation of the wiper motor is controlled during the forward or backward swing of the wiper to accelerate, decelerate or stop the wiper. Therefore, when the rotational speed of the wiper motor is changed in response to the operational mode at the time of changing the operational mode, the moving speed of the wiper is rapidly changed. Thus, the smooth change of the operation of the wiper is not possible. For example, when the operational mode is changed from the high speed mode to the low speed mode in the middle of accelerating the moving speed of the wiper, the moving speed of the wiper is temporarily decreased and is then increased once again. Therefore, the wiper looks like being temporarily hitched, so that the driver (user) of the vehicle may have an uncomfortable feeling.

SUMMARY OF THE INVENTION

The present invention is made in view of the above disadvantages. Thus, it is an objective of the present invention to provide a wiper system and a wiper control method, which enable a more smooth change of an operation of the wiper at the time of changing an operational mode of the wiper.

To achieve the objective of the present invention, there is provided a wiper system including a wiper, an electric motor, an entering means and a control means. The wiper is pivotably supported to swing over a wiping subject surface and thereby to wipe the wiping subject surface. The electric motor has an output shaft, which is connected to the wiper to transmit a rotational force of the electric motor to the wiper. The electric motor drives the wiper to execute a reciprocal swing operation of the wiper between an upper return position and a lower return position upon forward and backward rotations of the output shaft. The entering means is for entering one of a plurality of operational commands of the wiper to execute a corresponding one of a plurality of operational modes of the wiper that are preset to implement different moving speeds, respectively, of the wiper. The control means is for controlling the electric motor. When one of the plurality of operational commands, which commands execution of one of the plurality of operational modes, is entered through the entering means in the middle of the operation of the wiper in another one of the plurality of operational modes, the control means controls the electric motor such that the moving speed of the wiper, which is preset for the another one of the plurality of operational modes, is changed to the moving speed of the wiper, which is preset for the one of the plurality of operational modes, during a time period of executing a predetermined number of swings of the wiper between the upper return position and the lower return position upon entering of the one of the plurality of operational commands through the entering means.

To achieve the objective of the present invention, there is also provided a wiper control method for controlling a wiper that is pivotably supported to swing over a wiping subject surface and thereby to wipe the wiping subject surface. According to the wiper control method, an electric motor, which has an output shaft connected to the wiper to transmit a rotational force of the electric motor to the wiper, is controlled such that when one of a plurality of operational commands, which commands execution of one of a plurality of operational modes of the wiper that are preset to implement different moving speeds, respectively, of the wiper, is entered through an entering means in the middle of the operation of the wiper in another one of the plurality of operational modes, the moving speed of the wiper, which is preset for the another one of the plurality of operational modes, is changed to the moving speed of the wiper, which is preset for the one of the plurality of operational modes, during a time period of executing a predetermined number of swings of the wiper between an upper return position and a lower return position of the wiper upon entering of the one of the plurality of operational commands through the entering means.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiment of the present invention will be described with reference to the accompanying drawings.

First Embodiment

Figure 1:
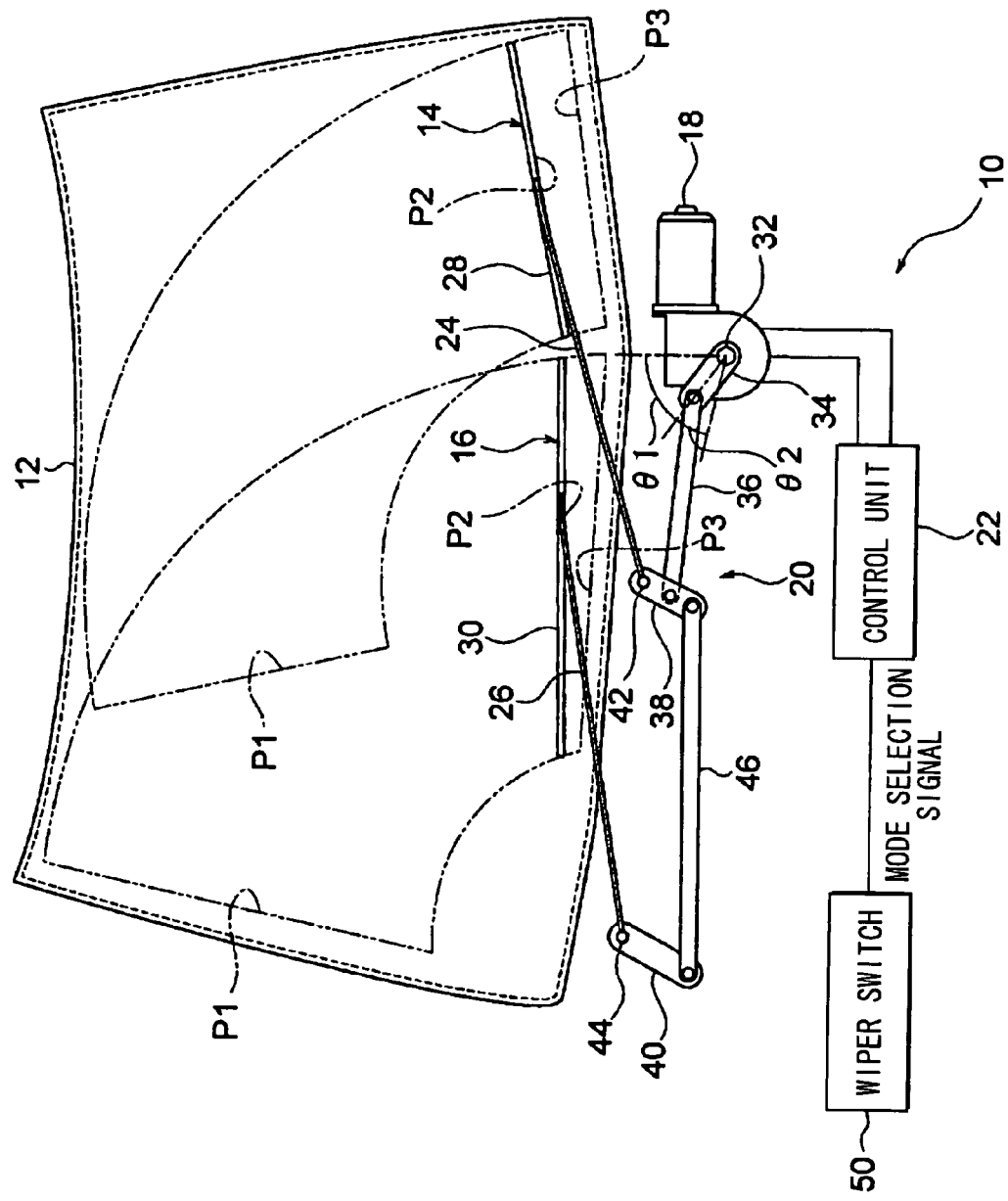
FIG. 1 is a schematic diagram showing an entire structure of a wiper system according to a first embodiment of the present invention.
Figure 2:
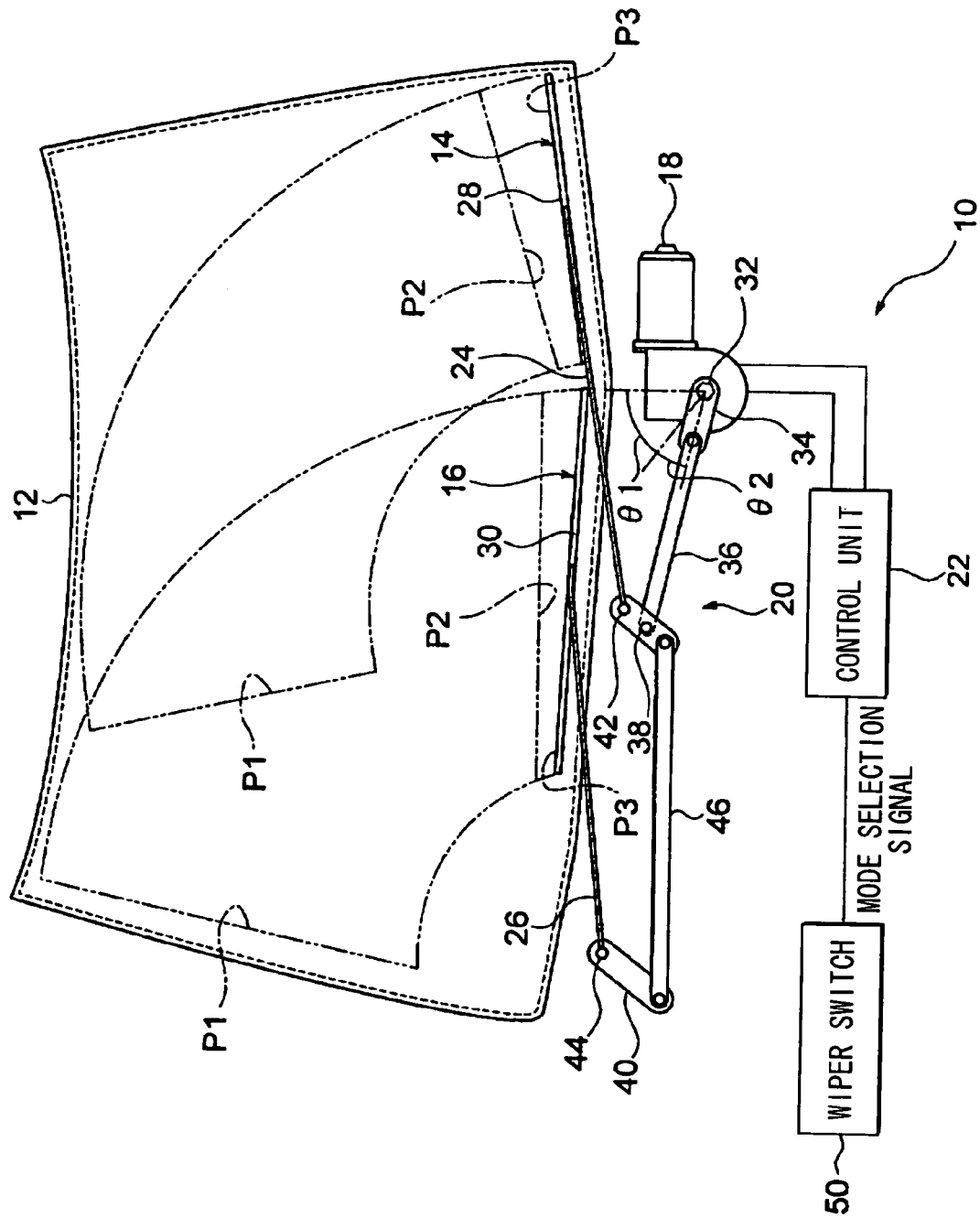
FIG. 2 is a schematic diagram showing the wiper system of FIG. 1, indicating wipers placed in a park position thereof.

FIGS. 1 and 2 show a wiper system 10 according to an embodiment of the present invention. The wiper system 10 wipes a front glass, i.e., a windshield (forming a wiping subject surface) 12 of a vehicle (e.g., an automobile) and includes two wipers 14, 16, a wiper motor (serving as an electric motor) 18, a link mechanism 20 and a control unit (serving as a control means) 22.

Each wiper 14, 16 includes a wiper arm 24, 26 and a wiper blade 28, 30. A base end portion of the wiper arm 24, 26 is fixed to a corresponding pivot shaft 42, 44, and the wiper blade 28, 30 is fixed to a distal end portion of the wiper arm 24, 26.

When the wiper arm 24, 26 is pivoted, i.e., is swung, the wiper 14, 16 is reciprocally swung over the front glass 12 to wipe the same.

The wiper motor 18 has an output shaft 32, which is rotatable in both a forward rotational direction and a backward rotational direction. The link mechanism 20 includes a crank arm 34, a first link rod 36, two pivot levers 38, 40, two pivot shafts 42, 44 and a second link rod 46.

One end portion of the crank arm 34 is fixed to the output shaft 32, and the other end portion of the crank arm 34 is rotatably connected to one end portion of the first link rod 36. The other end portion of the first link rod 36 is rotatably connected to one end portion of the pivot lever 38. Two opposed ends of the second link rod 46 are rotatably connected to the one end portions, respectively, of the pivot levers 38, 40.

Each pivot shaft 42, 44 is rotatably supported by a corresponding pivot holder (not shown), which is provided to a vehicle body. The other end portion of each pivot lever 38, 40 is fixed to the corresponding pivot shaft 42, 44.

In this wiper system 10, when the output shaft 32 is reciprocally rotated forward and backward within a first rotational angular range θ1, the rotational force of the output shaft 32 is transmitted to the wiper arms 24, 26 through the link mechanism 20 to reciprocally swing the wiper arms 24, 26. When each wiper arm 24, 26 is reciprocally swung, the corresponding wiper blade 28, 30 is reciprocally swung between an upper return position P1 and a lower return position P2 on the front glass 12.

Furthermore, in this wiper system 10, when the output shaft 32 is reciprocally rotated forward and backward in a second rotational angular range θ2, the wiper blade 28, 30 is displaced between the lower return position P2 and a park position P3 located below the lower return position P2.

In the following description, when the wiper blade 28, 30 is placed in the upper return position P1, the lower return position P2 and the park position P3, it is assumed or said that the wiper 14, 16 itself is placed in the upper return position P1, the lower return position P2 and the park position P3, respectively, for the descriptive purpose.

In the wiper system 10, as shown in FIG. 2, when the wiper 14, 16 is placed in the park position P3, the crank arm 34 and the first link rod 36 are aligned to extend generally along an imaginary straight line.

The control unit 22 includes an input circuit, an electronic control unit (ECU) and a drive circuit and is connected to a wiper switch (serving as an entering means) 50 and the wiper motor 18.

In the wiper system 10 of the present embodiment, one of a high speed mode (Hi), a low speed mode (Lo) and a stop mode can be executed upon entering a corresponding operational command (i.e., a high speed operational command, a low speed operational command and a stop command) through the manipulation of the wiper switch 50 as an operational mode of the wiper system 10. The low speed mode and the high speed mode may also be referred to as first and second operational modes, respectively. In the high speed mode, the wiper 14, 16 is reciprocally swung at a high speed by reciprocally rotating the output shaft 32 of the wiper motor 18 at a high speed. In the low speed mode, the wiper 14, 16 is reciprocally swung at a low speed by reciprocally rotating the output shaft 32 of the wiper motor 18 at a low speed. In the stop mode, the wiper 14, 16 is stopped. Furthermore, the operational modes of the wiper system 10 may further include any other operational mode(s), such as an intermittent operational mode and/or a mist (MIST) mode. In the intermittent operational mode, the wiper 14, 16 is intermittently reciprocally swung at predetermined time intervals. In the mist mode, the wiper 14, 16 is reciprocally swung only once.

The wiper switch 50 is operable by a driver (user) of a vehicle to place the wiper switch 50 into one of a high speed mode position, a low speed mode position and a stop mode position to execute the corresponding one of the high speed mode, the low speed mode and the stop mode. The wiper switch 50 outputs a corresponding mode selection signal (the corresponding operational command), which corresponds to the selected one of the high speed mode position, the low speed mode position and the stop mode position, to the control unit 22.

In the wiper system 10, when the control unit 22 receives the mode selection signal, which is outputted from the wiper switch 50, the control unit 22 shifts to the corresponding operational mode, which corresponds to the mode selection signal received from the wiper switch 50.

Figure 3:
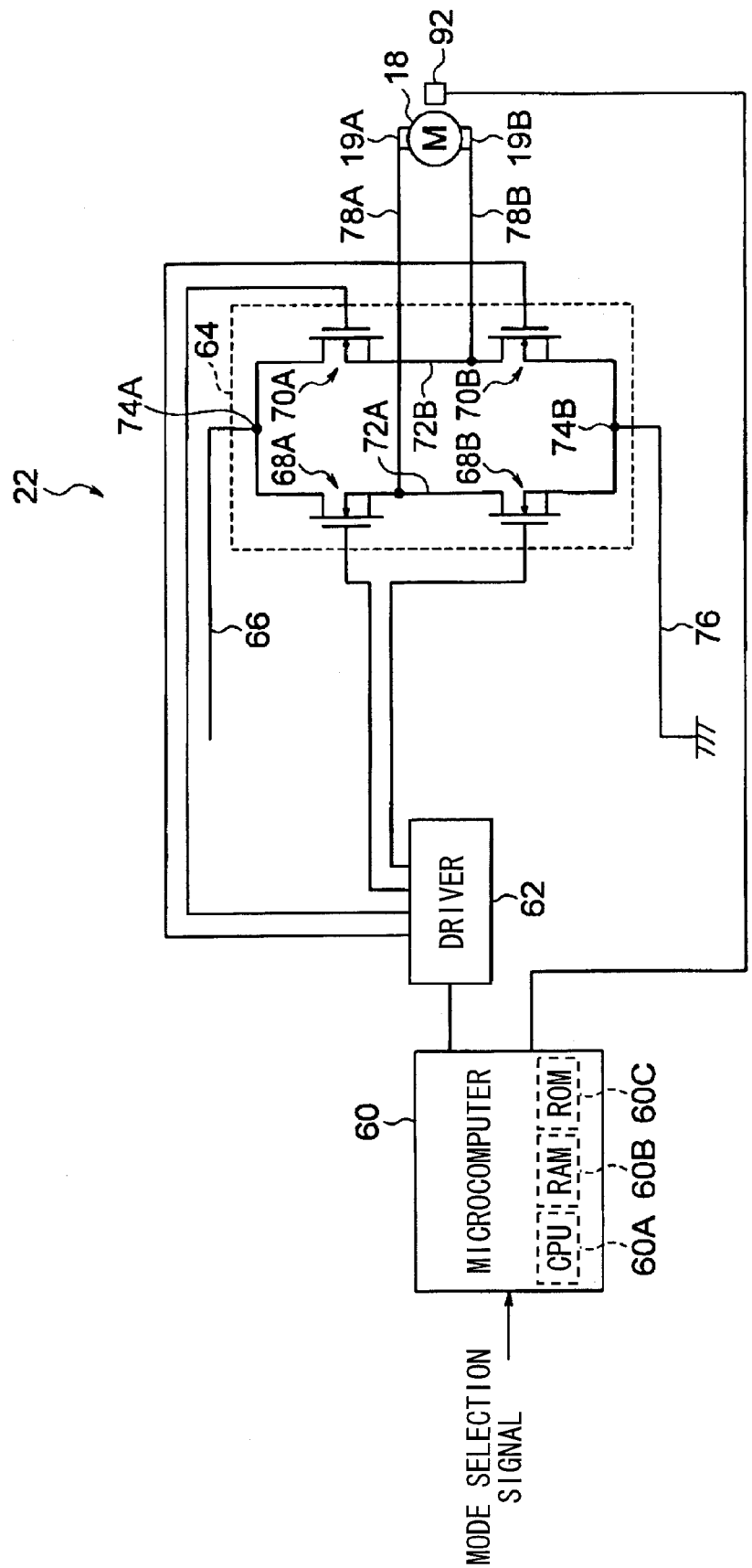
FIG. 3 is a block diagram showing a structure of a control unit of the wiper system according to the first embodiment.

FIG. 3 shows the structure of the control unit 22 according to the present embodiment.

The control unit 22 includes a microcomputer 60, a driver 62 and an inverter circuit 64.

The microcomputer 60 is connected with the wiper switch 50 and the driver 62. The microcomputer 60 receives the mode selection signal from the wiper switch 50. The microcomputer 60 includes a central processing unit (CPU) 60A, a random access memory (RAM) 60B and a read only memory (ROM) 60C. At least one of the RAM 60B and the ROM 60C serves as a storage device (a computer readable storage medium, a storage means) of the present invention. The microcomputer 60 outputs a control signal to the driver 62. This control signal commands the rotational direction of the wiper motor 18, the acceleration or deceleration of the wiper motor 18 or the stop of the wiper motor 18.

The driver 62 is connected to the microcomputer 60 and the inverter circuit 64. When the driver 62 receives the control signal from the microcomputer 60, the driver 62 outputs four switching signals to the inverter circuit 64 based on the control signal.

The inverter circuit 64 has four N-channel metal-oxide-semiconductor field-effect transistors (MOSFETs) as switching devices (elements) 68A, 68B, 70A, 70B, which control the power supply to the wiper motor 18. The four switching signals, which are outputted from the driver 62, are inputted to the gate terminals of the MOSFETs 68A, 68B, 70A, 70B. The inverter circuit 64 forms an H-bridge circuit. The MOSFET 68A and the MOSFET 68B are connected in series through a conductive line 72A, and the MOSFET 70A and the MOSFET 70B are connected in series through a conductive line 72B. The conductive line 72A and the conductive line 72B are connected in parallel. One of two connections between the conductive line 72A and the conductive line 72B has a connecting point 74A, which is connected to a power supply line 66 (and thereby to an electric power source, such as a battery). The other one of the two connections between the conductive line 72A and the conductive line 72B has a connecting point 74B, which is grounded through a conductive line 76.

The wiper motor 18 of the present embodiment is formed as a direct current (DC) brush motor having two brushes, which are connected to two electrodes 19A, 19B, respectively. One (specifically, the electrode 19A) of the electrodes 19A, 19B is connected to the conductive line 72A at a location between the source terminal of the MOSFET 68A and the drain terminal of the MOSFET 68B through a conductive line 78A. The other one (specifically, the electrode 19B) of the electrodes 19A, 19B is connected to the conductive line 72B at a location between the source terminal of the MOSFET 70A and the drain terminal of the MOSFET 70B through a conductive line 78B.

When the low level switching signal is supplied to the gate terminal of the MOSFET 68A, 68B, 70A, 70B, the MOSFET 68A, 68B, 70A, 70B is placed in an OFF state. Therefore, the electric current does not flow from the drain terminal to the source terminal in the MOSFET 68A, 68B, 70A, 70B. However, when the high level switching signal is supplied to the gate terminal of the MOSFET 68A, 68B, 70A, 70B, the MOSFET 68A, 68B, 70A, 70B is placed in an ON state. Therefore, the electric current flows from the drain terminal to the source terminal in the MOSFET 68A, 68B, 70A, 70B.

When the MOSFET 68A and the MOSFET 70B are turned on, the electric current flows from the electrode 19A to the electrode 19B, so that the output shaft 32 is rotated in the one direction. In contrast, when the MOSFET 68B and the MOSFET 70A are turned on, the electric current flows from the electrode 19B to the electrode 19A, so that the output shaft 32 is rotated in the other direction.

When the control signal, which commands the rotation of the output shaft 32 in the one direction, is supplied to the driver 62 from the microcomputer 60, the driver 62 starts to output the high level switching signal to the MOSFET 68A, 70B. In contrast, when the control signal, which commands the rotation of the output shaft 32 in the other one direction, is supplied to the driver 62 from the microcomputer 60, the driver 62 starts to output the high level switching signal to the MOSFET 68B, 70A. Furthermore, when the control signal, which commands the stop of the wiper motor 18, is supplied to the driver 62 from the microcomputer 60, the driver 62 outputs the low level switching signal to the MOSFETs 68A, 68B, 70A, 70B.

The driver 62 controls the rotational speed of the wiper motor 18 through a pulse width modulation (PWM) control operation. The driver 62 changes a duty ratio of the switching signal based on the control signal, which is received from the microcomputer 60 and commands the acceleration or deceleration of the wiper motor 18.

The microcomputer 60 controls the rotation of the wiper motor 18 through the driver 62 to reciprocally swing the wipers 14, 16.

The microcomputer 60 determines whether each wiper 14, 16 is located in the upper return position P1, the lower return position P2 or the park position P3. This determination may be made as follows. For instance, a rotation sensing switch device (not shown), which includes a plurality of rotation sensing switches, may be provided in the wiper motor 18 to sense the rotational position of the wiper motor 18 (more specifically, the rotational position of the output shaft 32). The microcomputer 60 may determine whether the wiper 14, 16 is located in the upper return position P1, the lower return position P2 or the park position P3 based on a signal outputted from the rotation sensing switch device.

A rotation sensing device (e.g., a rotary encoder) 92, which senses rotation of a rotor of the wiper motor 18, is provided in the wiper motor 18. The rotation sensing device 92 outputs a pulse signal, which has a pulse cycle period that corresponds to the rotational speed of the rotor, to the microcomputer 60.

The microcomputer 60 can determine the rotational speed of the wiper motor 18 based on the pulse cycle period of the pulse signal, which is received from the rotation sensing device 92. The microcomputer 60 can sense the position of the wiper 14, 16 in the movable range (swingable range) of the wiper 14, 16 by counting the number of pulses of the pulse signal, which is received from the rotation sensing device 92, since the time of presence of the wiper 14, 16 at the upper return position P1, the lower return position P2 or the park position P3.

Next, the operation of the wiper system 10 of the present embodiment will be described.

In the present embodiment, the ROM 60C of the microcomputer 60 stores operational mode specific speed information, which indicates the rotational speed of the wiper motor 18 at the respective positions of the wiper 14, 16 in the movable range of the wiper 14, 16 for each of the corresponding operational modes. The rotational speed of the wiper motor 18, which is indicated in the operational mode specific speed information, is low at or around each of the upper return position P1 and the lower return position P2 and is increased at a center area between the upper return position P1 and the lower return position P2. The rotational speed of the wiper motor 18 in the high speed mode is set to be higher than that of the low speed mode at least in the center area in the movable range of the wiper 14, 16. Based on the signal received from the microcomputer 60, the wiper motor 18 repeats the stop, the acceleration and the deceleration in this order at the time of driving the wiper 14, 16 between the upper return position P1 and the lower return position P2 and has the highest rotational speed in the center area between the upper return position P1 and the lower return position P2.

At the time of driving the wipers 14, 16, the user manipulates the wiper switch 50 to change the operational mode.

When the wiper switch 50 is manipulated by the user, the microcomputer 60 executes the control operation to drive the wipers 14, 16 at the selected operational mode, which is selected and commanded by the user through the manipulation of the wiper switch 50.

Figure 4A:
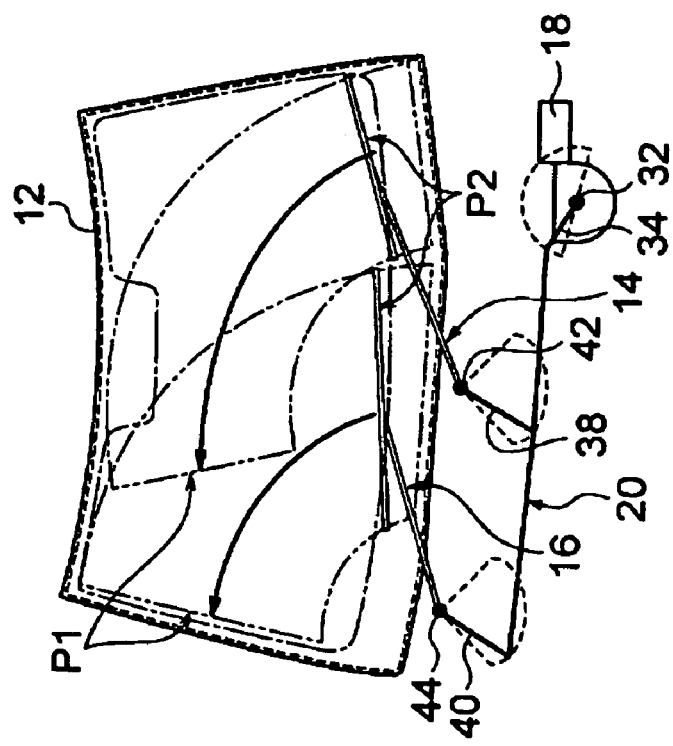
FIGS. 4A and 4B are schematic diagrams showing various operational positions of the wiper system of the first embodiment operated in a high speed mode or a low speed mode.
Figure 4B:
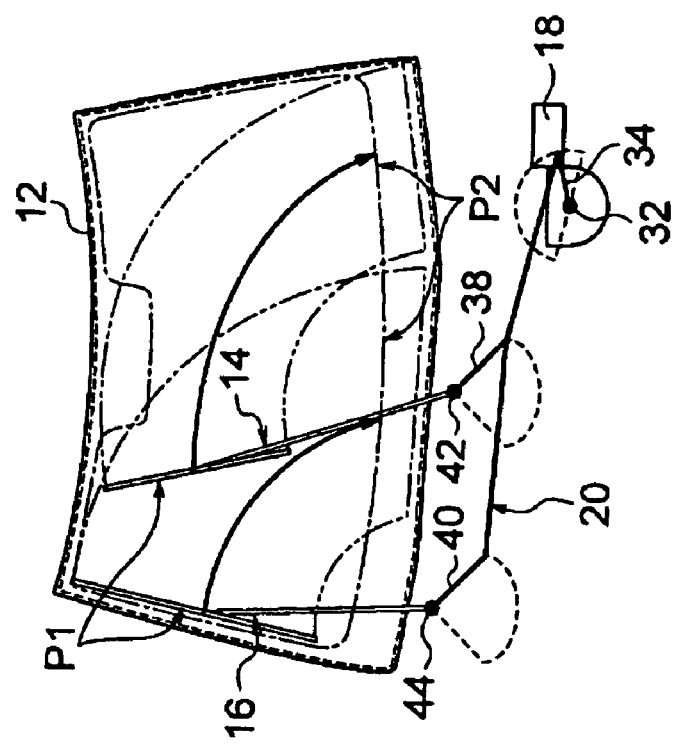

With reference to FIGS. 4A and 4B, when the high speed mode or the low speed mode is selected through the manipulation of the wiper switch 50, the microcomputer 60 outputs the control signal, which commands the rotation of the wiper motor 18 in the one direction, to the driver 62 to rotate the output shaft 32 of the wiper motor 18 in the one direction. Thereby, each wiper 14, 16 is moved toward the upper return position P1 thereof (see FIG. 4A). That is, each wiper 14, 16 is moved to make an upward swing. When the microcomputer 60 senses the presence of the wiper 14, 16 at the upper return position P1, the microcomputer 60 outputs the control signal, which commands the rotation of the wiper motor 18 in the other direction, to the driver 62 to rotate the output shaft 32 of the wiper motor 18 in the other direction. Thereby, the wiper 14, 16 is moved toward the lower return position P2 thereof (see FIG. 4B). That is, each wiper 14, 16 is moved to make a downward swing. Then, when the microcomputer 60 senses the presence of the wiper 14, 16 at the lower return position P2, the microcomputer 60 outputs the control signal, which commands the rotation of the wiper motor 18 in the one direction, to the driver 62 to rotate the output shaft 32 of the wiper motor 18 in the one direction, and so on. By repeating the above process, the wiper 14, 16 is continuously reciprocally swung between the upper return position P1 and the lower return position P2.

In the middle of executing the operation of the wiper 14, 16 in the high speed mode or the low speed mode, the microcomputer 60 senses the rotational speed of the wiper motor 18 based on the pulse cycle period of the pulse signal, which is received from the rotation sensing device 92. Furthermore, the microcomputer 60 senses the position of the wiper 14, 16 in the movable range of the wiper 14, 16 by counting the number of the pulses of the pulse signal, which is received from the rotation sensing device 92, since the time of presence of the wiper 14, 16 at the upper return position P1 or the lower return position P2. The microcomputer 60 outputs the control signal to the driver 62 such that the command signal commands the acceleration or deceleration of the wiper motor 18 to coincide the current rotational speed of the wiper motor 18 with the specified rotational speed (preset rotational speed) of the wiper motor 18 that is specified (preset) for the current location of the wiper 14, 16 in the operational mode specific speed information associated with the selected operational mode, which is selected and is commanded through the manipulation of the wiper switch 50. In this way, the wiper motor 18 is rotated at the rotational speed, which corresponds to the current location of the wiper 14, 16 and is indicated in the operational mode specific speed information, to reciprocally drive the wiper 14, 16. At this time, since the moving speed of the wiper 14, 16 is proportional to the rotational speed of the wiper motor 18, the current moving speed of the wiper 14, 16 is adjusted to the specified moving speed (preset moving speed) of the wiper 14, 16 that is specified (preset) for the current location of the wiper 14, 16 in the operational mode specific speed information associated with the selected operational mode.

Furthermore, in the middle of executing the operation of the wiper 14, 16 in the high speed mode or the low speed mode, when the current operational mode is changed to the other selected operational mode (e.g., from the high speed mode to the low speed mode) through the manipulation of the wiper switch 50, the microcomputer 60 executes an operational mode change process to change the current operational mode to the selected operational mode during a time period of executing the predetermined number of swings (the predetermined number of the upward and downward swings, i.e., the predetermined number of reciprocal movements) of the wiper 14, 16 between the upper return position P1 and the lower return position P2. In the present embodiment, the predetermined number of the swings of the wiper 14, 16 between the upper return position P1 and the lower return position P2 is set to be five, and the moving speed of the wiper 14, 16 is progressively changed during this time period. Specifically, the moving speed of the wiper 14, 16 is changed in each of the five swings toward the target moving speed of the wiper 14, 16, i.e., the preset moving speed of the wiper 14, 16, which is preset for the operational mode to be implemented after the mode change.

Figure 5:
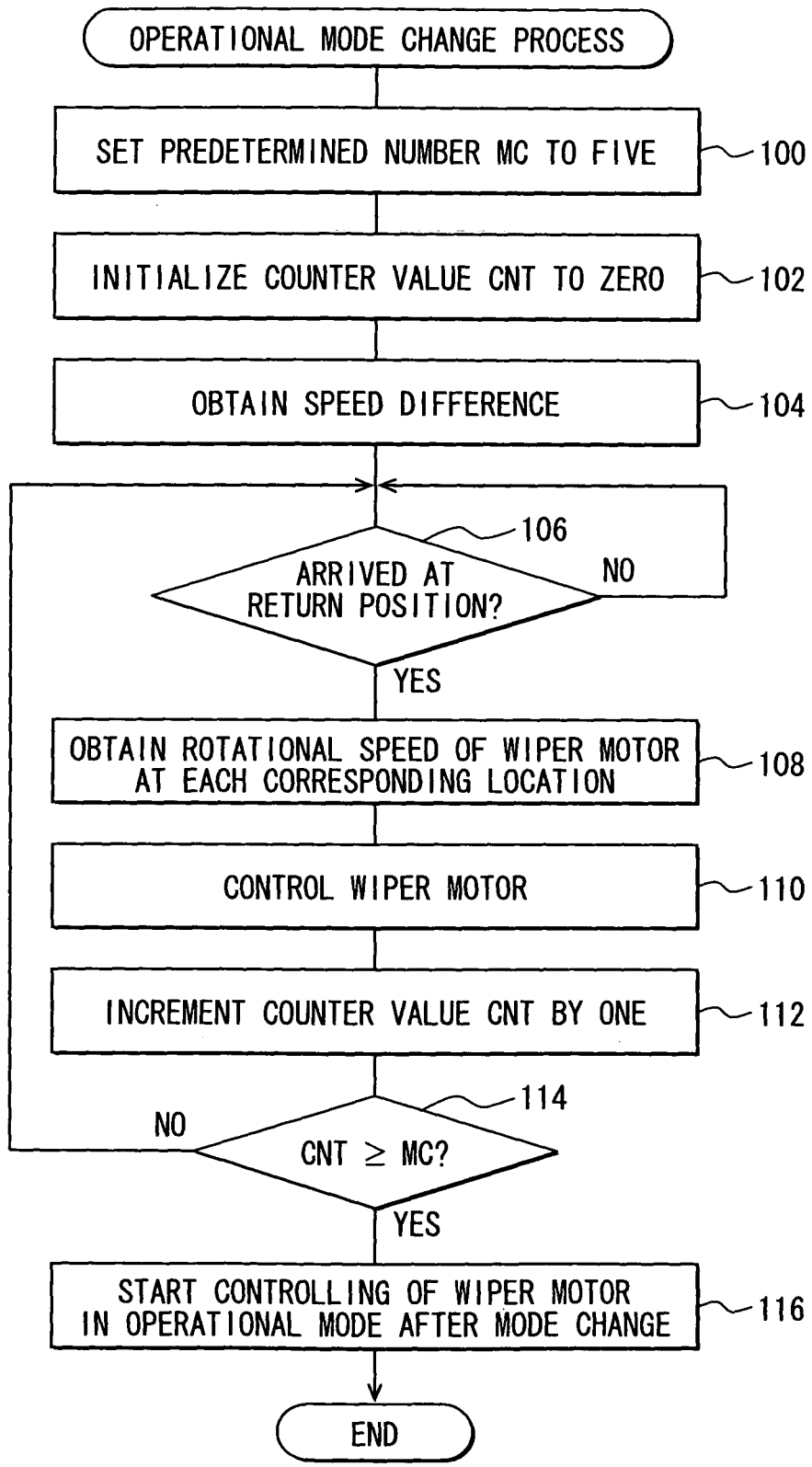
FIG. 5 is a flowchart showing an operational mode change process performed by executing an operational mode change program according to the first embodiment.

FIG. 5 shows the flow of the operational mode change process, which is performed by executing an operational mode change program at the CPU 60A of the microcomputer 60 at the time of changing the operational mode. The program is prestored in a predetermined memory area of the ROM 60C.

At step 100, the predetermined number MC of swings of the wiper 14, 16 between the upper return position P1 and the lower return position P2 is set to five.

At step 102, a value (a counter value) CNT of a counter is initialized to zero (0).

Thereafter, at step 104, for each of the corresponding positions in the movable range of the wiper 14, 16, the rotational speed of the wiper motor 18, which is indicated in the operational mode specific speed information of the operational mode to be implemented after the mode change, is subtracted from the rotational speed of the wiper motor 18, which is indicated in the operational mode specific speed information of the operational mode to be implemented before the mode change to obtain a speed difference $\Delta X$ at each of the corresponding positions in the movable range of the wiper 14, 16.

Then, at step 106, the arrival of the wiper 14, 16 at the upper return position P1 or the lower return position P2 is waited.

Next, at step 108, the rotational speed of the wiper motor 18 at each of the corresponding locations in the movable range of the wiper 14, 16 in the next reciprocal movement of the wiper 14, 16 is obtained.

In the present embodiment, the amount of change in the rotational speed of the wiper motor 18 in each of the corresponding locations in the movable range of the wiper 14, 16 during the time period of changing the operational mode is obtained by multiplying the speed difference $\Delta X$ Of the corresponding location obtained at step 104 by a value, which is obtained by (the predetermined number MC of swings−the counter value CNT)/(the predetermined number MC of swings+1). Then, for each of the corresponding positions in the movable range of the wiper 14, 16, the rotational speed of the wiper motor 18 during the time period of changing the operational mode is obtained by adding the above amount of change in the rotational speed of the wiper motor 18 at that location to the rotational speed of the wiper motor 18 at that location indicated in the operational mode specific speed information of the operational mode to be implemented after the mode change.

Thereafter, at step 110, for each of the corresponding locations in the movable range of the wiper 14, 16, the microcomputer 60 starts to control the wiper motor 18. Specifically, the microcomputer 60 starts to output each corresponding control signal, which commands the acceleration or deceleration of the wiper motor 18 at the corresponding location to adjust the rotational speed of the wiper motor 18 to the rotational speed at the corresponding location obtained at step 108, to the driver 62 to drive the wiper motor 18 and thereby to move the wiper 14, 16.

At next step 112, a value of 1 is added to the counter value CNT to increment the same.

Thereafter, at step 114, it is determined whether the counter value CNT is equal to or larger than the predetermined number MC of swings of the wiper 14, 16. When it is determined that the counter value CNT is equal to or larger than the predetermined number MC of swings at step 114 (i.e., YES at step 114), the microcomputer 60 proceeds to step 116. In contrast, when it is determined that the counter value CNT is smaller than the predetermined number MC of swings at step 114 (i.e., NO at step 114), the microcomputer 60 returns to step 106. In this way, steps 106-114 are repeated until the counter value CNT becomes equal to the predetermined number MC of swings by completing the five swings of the wiper 14, 16 between the upper return position P1 and the lower return position P2.

At step 116, the control operation of the wiper motor 18 in the operational mode to be implemented after the mode change is started, and the mode change process is terminated.

Specifically, according to the present embodiment, in the middle of executing the operation of the wiper 14, 16 in the high speed mode or the low speed mode, when the current operational mode is changed to the other selected operational mode through the manipulation of the wiper switch 50, the microcomputer 60 controls the wiper motor 18 to progressively change the rotational speed thereof during the time period of the five swings of the wiper 14, 16 between the upper return position P1 and the lower return position P2 from the highest rotational speed of the wiper motor 18 in the operational mode to be implemented before the mode change to the highest rotational speed of the wiper motor 18 in the operational mode to be implemented after the mode change.

In this way, at the time of changing the operational mode, the moving speed of the wiper 14, 16 is progressively changed to smoothly change the operational mode to the selected operational mode to be implemented after the mode change.

Figure 6:
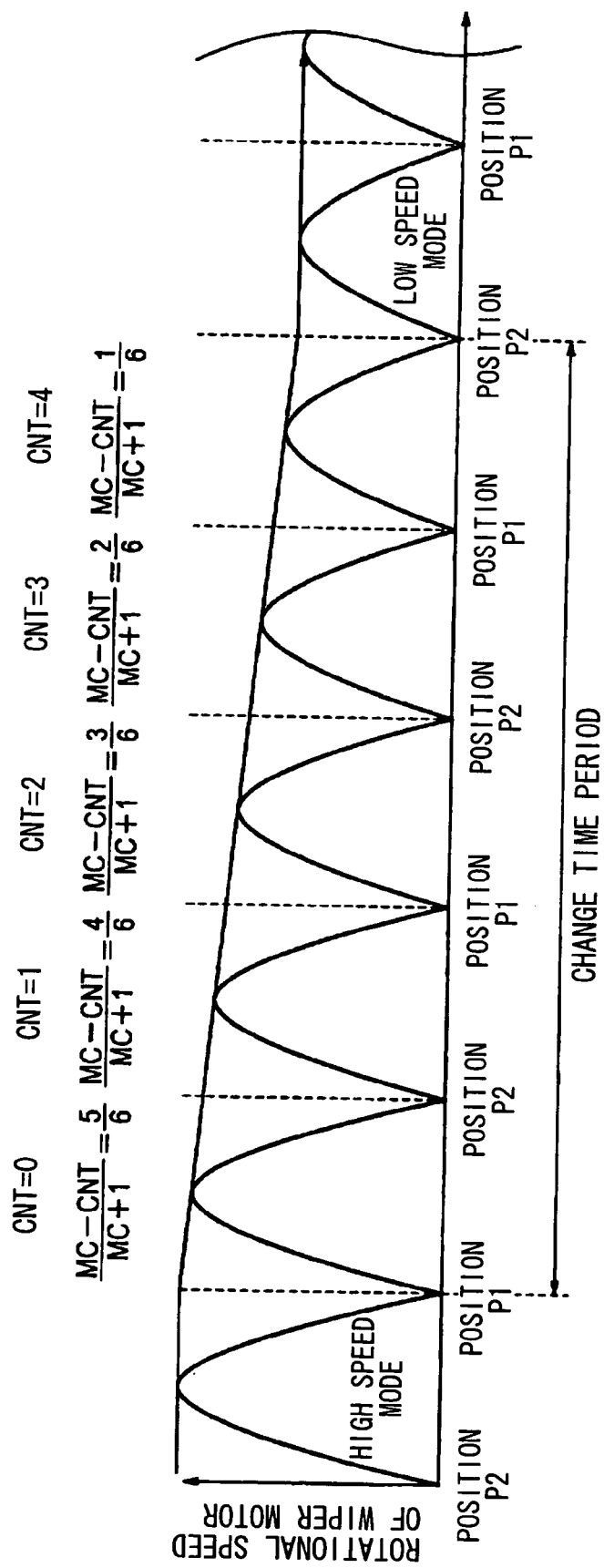
FIG. 6 is a diagram showing a change in a rotational speed of a wiper motor in a case where an operational mode of the wiper system of the first embodiment is changed from the high speed mode to the low speed mode.

FIG. 6 shows a change in the rotational speed of the wiper motor 18 in the case of changing the operational mode from the high speed mode to the low speed mode. In FIG. 6 as well as FIGS. 8 and 10 discussed below, the rotational speed of the wiper motor 18 is indicated as an absolute value.

In the section of CNT=0, the acceleration of the rotational speed of the wiper motor 18 starts at the upper return position P1, and the rotational speed of the wiper motor 18 reaches the highest rotational speed (the maximum rotational speed) in the center area between the upper return position P1 and the lower return position P2. Thereafter, the rotational speed of the wiper motor 18 is decelerated, and the rotation of the wiper motor 18 stops at the lower return position P2. In the next section of CNT=1, the acceleration of the wiper motor 18 starts at the lower return position P2, and the rotational speed of the wiper motor 18 reaches the highest rotational speed in the center area between the lower return position P2 and the upper return position P1. Thereafter, the rotational speed, of the wiper motor 18 is decelerated, and the rotation of the wiper motor 18 stops at the upper return position P1. As shown in FIG. 6, the highest rotational speed of the wiper motor 18 in the section of CNT=1 is smaller than the highest rotational speed of the wiper motor 18 in the section of CNT=0. In the following section of CNT=2, the highest rotational speed of the wiper motor 18 is further reduced from the highest rotational speed of the wiper motor 18 in the section of CNT=1. As discussed above, the highest rotational speed of the wiper motor 18, which is preset for the operational mode to be implemented before the mode change, is progressively changed to the highest rotational speed of the wiper motor 18, which is preset for the operational mode to be implemented after the mode change, through each of the five swings (upward and downward swings).

Thereby, according to the present embodiment, in the middle of executing the operation of the wiper 14, 16 in the one of the operational modes, when the operational command to change the operational mode of the wiper motor 18 is entered through the wiper switch 50, the wiper motor 18 is controlled such that the moving speed of the wiper 14, 16 is changed from the moving speed of the wiper 14, 16 in the operational mode to be implemented before the mode change to the moving speed of the wiper 14, 16 in the operational mode to be implemented after the mode change during the time period of the predetermined number of swings (five in this instance) of the wiper 14, 16 between the upper return position P1 and the lower return position P2. Therefore, the movement of the wiper 14, 16 can be smoothly changed at the time of changing the operational mode.

Second Embodiment

Next, there will be described a case where the operational mode is changed at the time of arrival of the wiper 14, 16 at the upper return position P1 or the lower return position P2 upon entering of the operational command to change the current operational mode to the other operational mode, in which the moving speed of the wiper 14, 16 is higher than that of the current operational mode.

The structure of the wiper system 10 and the structure of the control unit 22 according to the second embodiment are the same as those of the first embodiment (see FIGS. 1 to 3).

Figure 7:
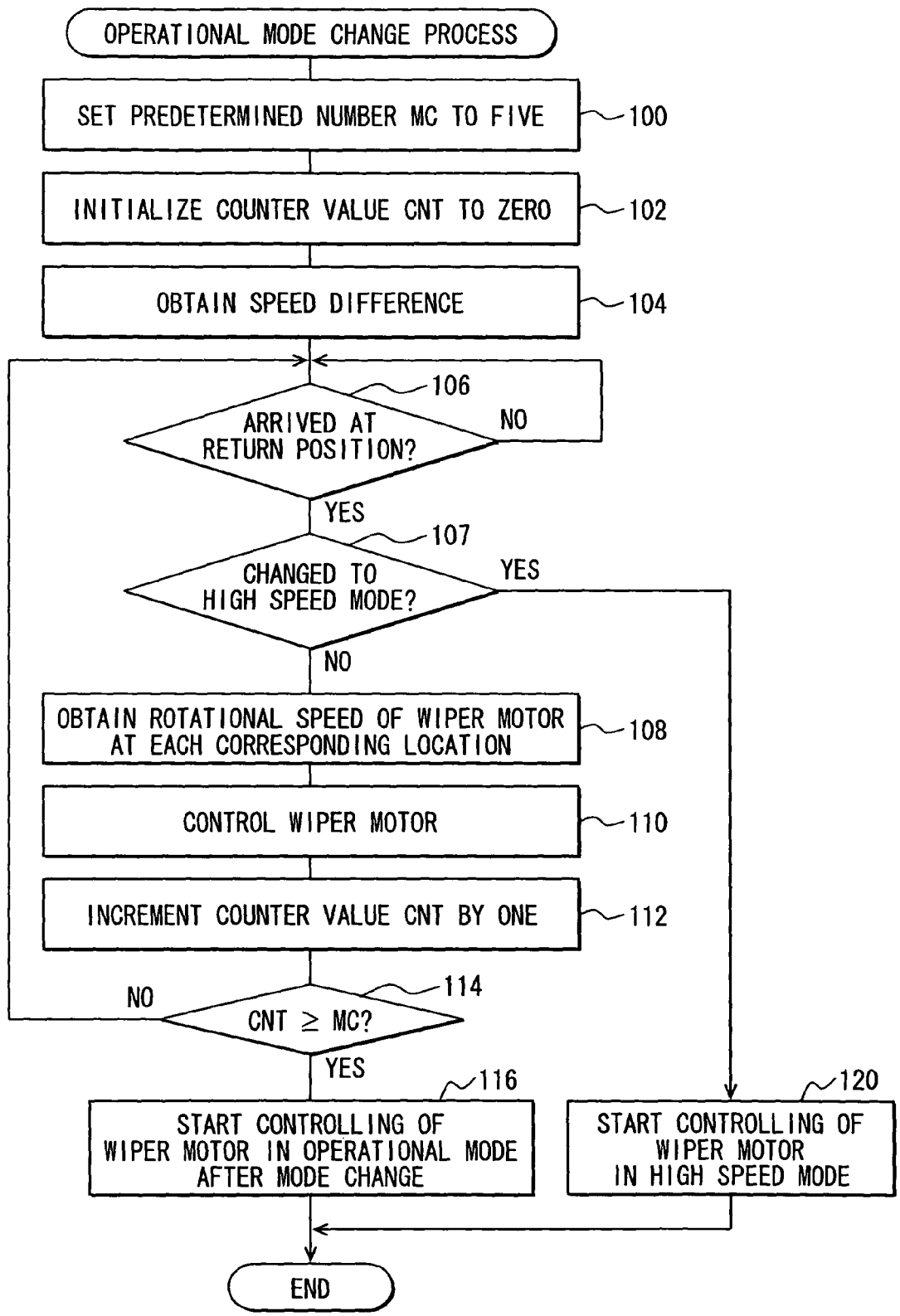
FIG. 7 is a flowchart showing an operational mode change process performed by executing an operational mode change program according to a second embodiment of the present invention.

FIG. 7 shows the flow of the operational mode change process, which is performed by executing a corresponding operational mode change program at the CPU 60A of the microcomputer 60 at the time of changing the operational mode. Steps similar to those of the first embodiment (see FIG. 5) will be indicated by the same reference numerals and will not be described for the sake of simplicity.

At step 107, it is determined whether the operational mode is changed to the high speed mode through the wiper switch 50. When it is determined that the operational mode is changed to the high speed mode at step 107 (i.e., YES at step 107), the microcomputer 60 proceeds to step 120. In contrast, when it is determined that the operational mode is not changed to the high speed mode at step 107 (i.e., NO at step 107), the microcomputer 60 proceeds to step 108.

At step 120, the control operation of the wiper motor 18 at the high speed mode starts, so that the mode change process is terminated.

In this way, in the case of changing the operational mode from the low speed mode to the high speed mode or in the case of changing the operational mode from the high speed mode to the low speed mode and is then changed to the high speed mode once again in the middle of the operational mode change process from the high speed mode to the low speed mode, the operation in the high speed mode starts.

Figure 8:
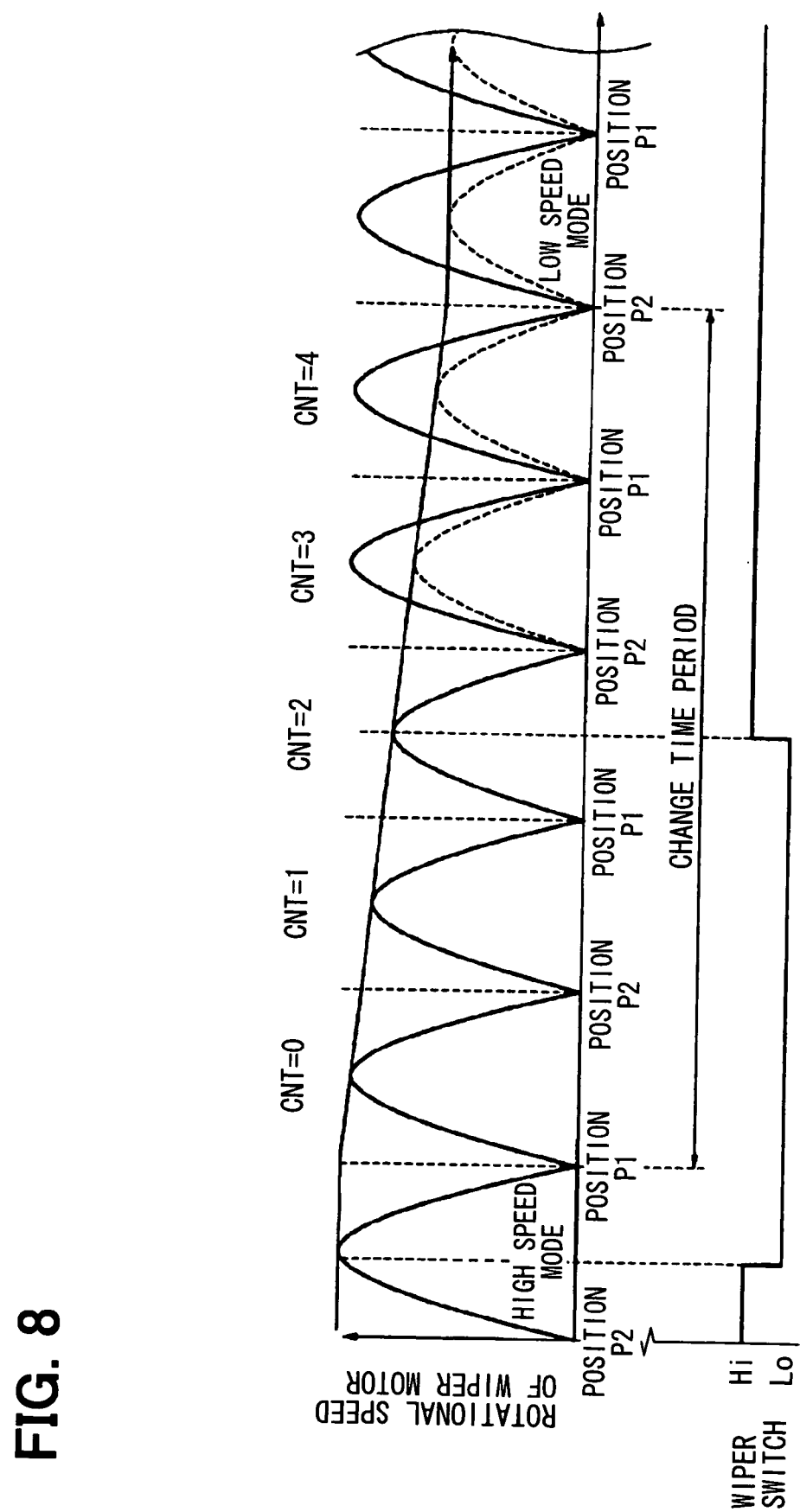
FIG. 8 is a diagram showing a change in the rotational speed of the wiper motor in a case where the operational mode of the wiper system of the second embodiment is changed from the high speed mode to the low speed mode.

FIG. 8 shows a change in the rotational speed of the wiper motor 18 in the case where the operational mode is changed from the high speed mode to the low speed mode and is thereafter changed to the high speed mode once again in the middle of the operational mode change process from the high speed mode to the low speed mode.

In the case of changing the operational mode to the low speed mode, the microcomputer 60 controls the wiper motor 18 such that the highest rotational speed of the wiper motor 18 in the operational mode to be implemented before the mode change is progressively changed to the highest rotational speed of the wiper motor 18 in the operational mode to be implemented after the mode change.

In this way, during the mode change process from the high speed mode to the low speed mode, the highest rotational speed of the wiper motor 18 in the high speed mode is progressively reduced to the highest rotational speed of the wiper motor 18 in the low speed mode. However, in the case where the operational mode is changed from the low speed mode to the high speed mode in the middle of the operation of the wiper 14, 16 in the section of CNT=2 (i.e., the counter value being 2), the operation of the wiper 14, 16 in the high speed mode starts when the wiper 14, 16 arrives at the lower return position P2.

As discussed above, according to the present embodiment, the operational mode is changed at the time of arrival of the wiper 14, 16 at the upper return position P1 or the lower return position P2 upon entering of the operational command to change the current operational mode to the other operational mode, in which the moving speed of the wiper 14, 16 is higher than that of the current operational mode. In this way, the movement of the wiper 14, 16 can be quickly changed in the mode change process.

Furthermore, according to the present embodiment, the operational mode is changed at the time of arrival of the wiper 14, 16 at the upper return position P1 or the lower return position P2 upon entering of the operational command to change the current operational mode to the other operational mode, in which the moving speed of the wiper 14, 16 is higher than that of the current operational mode, even in the middle of the operational mode change process, so that the movement of the wiper 14, 16 can be changed quickly.

In each of the above embodiments, the moving speed of the wiper 14, 16 is progressively changed during the period of executing the swings of the wiper 14, 16 between the upper return position P1 and the lower return position P2 for five times. However, the present invention is not limited to this. For example, the predetermined number MC of swings of the wiper 14, 16 may be changed such that the mode change process is completed when the wiper 14, 16 arrives at the lower return position P2. In such a case, the predetermined number MC is set to five when the operational mode is changed in the middle of the movement of the wiper 14, 16 from the lower return position P2 to the upper return position P1, and the predetermined number MC is set to six when the operational mode is changed in the middle of the movement of the wiper 14, 16 from the upper return position P1 to the lower return position P2. Thereby, the operational mode change is completed when the wiper 14, 16 arrives at the lower return position P2.

Figure 9:
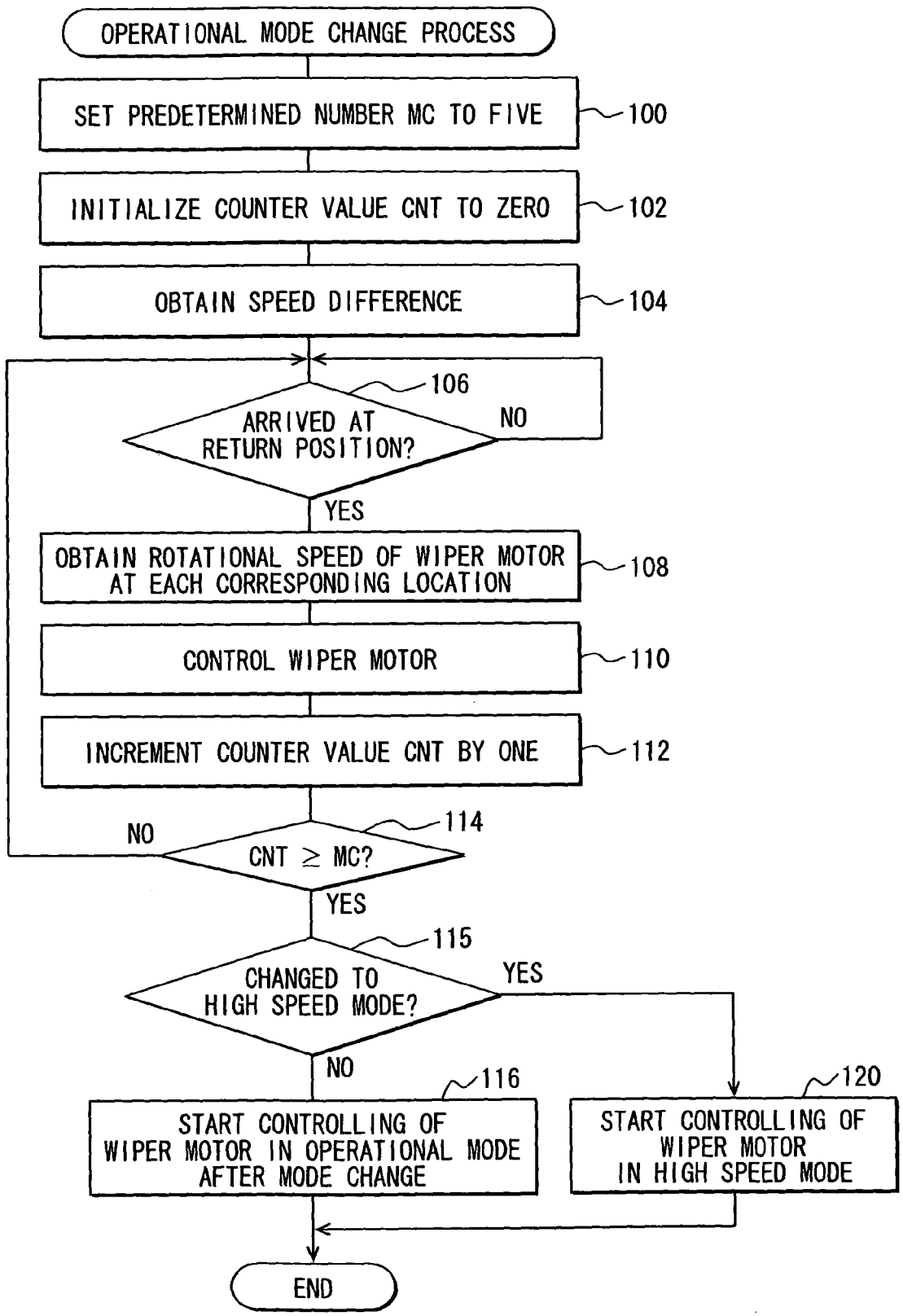
FIG. 9 is a flowchart showing a modification of the flow of the operational mode change process performed by executing the operational mode change program according to the second embodiment.
Figure 10:
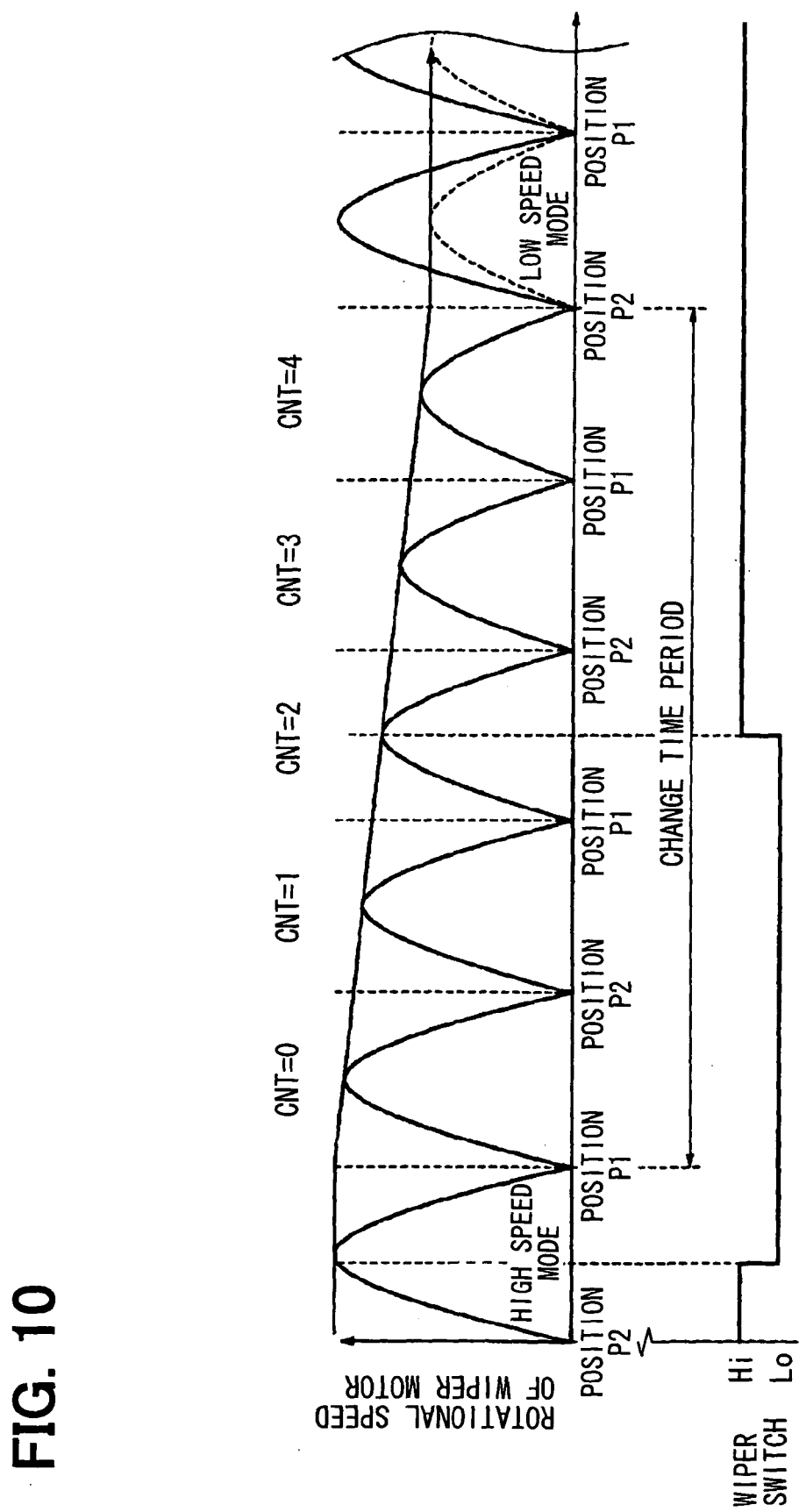
FIG. 10 is a diagram showing a change in the rotational speed of the wiper motor in a modification of the second embodiment.

Furthermore, in the second embodiment, in the case where the operational mode is changed from the high speed mode to the low speed mode and is then changed to the high speed mode in the middle of the operational mode change process from the high speed mode to the low speed mode, the operation in the high speed mode starts immediately upon arriving of the wiper 14, 16 at the upper return position P1 or the lower return position P2. However, the present invention is not limited to this. For example, the flowchart of FIG. 7 of the second embodiment may be modified to a flowchart of FIG. 9. Specifically, as shown in FIG. 9, when the operational mode change process from the high speed mode to the low speed mode is completed upon the completion of the predetermined number MC of the swings (i.e., YES at step 114), the microcomputer 60 proceeds to step 115. At step 115, the microcomputer 60 determines whether the operational mode is changed to the high speed mode through the wiper switch 50. When it is determined that the operational mode is changed to the high speed mode after the completion of the operational mode change process from the high speed mode to the low speed mode at step 115 (i.e., YES at step 115), the microcomputer 60 may proceeds to step 120 where the control operation of the wiper motor 18 in the high speed mode starts. In contrast, when it is determined that the operational mode is not changed to the high speed mode after the completion of the operational mode change process from the high speed mode to the low speed mode at step 115 (i.e., NO at step 115), the microcomputer 60 may proceeds to step 116. In this way, as shown in FIG. 10, even in the case where the operational mode is changed in the middle of executing the operation of the wiper 14, 16 in the section of CNT=2, the high speed mode starts only after the end of the time period of the operational mode change process (the end of the five swings of the wiper 14, 16) of changing from the high speed mode to the low speed mode.

Furthermore, in the above embodiments, the operational mode specific speed information of each corresponding operational mode is stored in the ROM 60C. Alternatively, standard speed information, which indicates a standard rotational speed of the wiper motor 18 (thereby a standard moving speed of the wiper 14, 16) at each of the corresponding locations in the movable range of the wiper 14, 16, may be stored in the ROM 60C. Then, the CPU 60A may multiply the standard rotational speed of the wiper motor 18 at the corresponding location, which is indicated in the standard speed information, by a corresponding coefficient, which is set depending on the operational mode. Specifically, for example, when the operational mode of the higher moving speed of the wiper 14, 16, which is higher than the standard rotational speed at the corresponding location, is selected, the coefficient is increased to increase the rotational speed of the wiper motor 18 to a value (the value corresponding to the preset rotational speed of the wiper motor 18, which is preset for the selected operational mode) that is obtained by multiplying the standard rotational speed of the wiper motor 18 by the corresponding coefficient. Here, the coefficients may be preset for the operational modes, respectively, and each of these coefficients may be set to be proportional to the preset rotational speed of the wiper motor 18 (the preset moving speed of the wiper 14, 16), which is preset for the subject operational mode, relative to the standard rotational speed of the wiper motor 18 (the standard moving speed of the wiper 14, 16). In the middle of executing the operation of the wiper 14, 16 in one of the selectable operational modes, when the current operational mode is changed to the other selected one of the operational modes through the wiper switch 50, the CPU 60A may change the coefficient of the current operational mode to the coefficient of the other selected one of the operational modes during the time period of executing the predetermined number of swings of the wiper 14, 16 between the upper return position P1 and the lower return position P2. In this way, it is no longer required to store the mode specific speed information for each of the operational modes. Thereby, it is possible to minimize the storage space of the ROM 60C. The standard rotational speed of the wiper motor 18 (thereby the standard moving speed of the wiper 14, 16) at each of the corresponding locations in the movable range of the wiper 14, 16 may be the preset rotational speed of the wiper motor 18 (the preset moving speed of the wiper 14, 16) of any one of the selectable operational modes.

Furthermore, in each of the operational modes, the rotational speed of the wiper motor 18 is stored as the value, which corresponds to the moving speed of the wiper 14, 16. Alternatively, the moving speed of the wiper 14, 16 may be stored in the storage device (e.g., ROM 60C).

Furthermore, in each of the above embodiments, the moving speed of the wiper 14, 16 is progressively changed in both of the forward and backward swings of the wiper 14, 16. Alternatively, the moving speed of the wiper 14, 16 may be progressively changed only in one of the forward and backward swings of the wiper 14, 16.

Furthermore, in each of the above embodiments, the command, which commands the change in the operational mode, is entered through the wiper switch 50. Alternatively, for example, the command, which commands the change in the operational mode, may be entered automatically in a manner similar to that of the automatic wiper (also, simply referred to as an auto wiper), in which the operational mode is automatically changed based on the amount of raindrops, which are adhered to the window glass and are sensed with a raindrop sensor.

The structure (see FIGS. 1 and 2) of the wiper system 10 and the structure (see FIG. 3) of the control unit 22 discussed in the above embodiments are mere illustrative and may be modified in any appropriate manner within a spirit and scope of the present invention.

Furthermore, each of the flows of operational mode change processes, each of which is performed by executing the corresponding operational mode change program (see FIGS. 5, 7 and 9), is mere illustrative and may be modified in any appropriate manner within a spring and scope of the present invention.

What is claimed is:

1. A wiper system comprising:
    a wiper that is pivotably supported to swing over a wiping subject surface and thereby to wipe the wiping subject surface;
    an electric motor that has an output shaft, which is connected to the wiper to transmit a rotational force of the electric motor to the wiper, wherein the electric motor drives the wiper to execute a reciprocal swing operation of the wiper between an upper return position and a lower return position upon forward and backward rotations of the output shaft;
    an entering means for entering one of a plurality of operational commands of the wiper to execute a corresponding one of a plurality of operational modes of the wiper that are preset to implement different moving speeds, respectively, of the wiper; and
    a control means for controlling the electric motor, wherein when one of the plurality of operational commands, which commands execution of one of the plurality of operational modes, is entered through the entering means in the middle of the operation of the wiper in another one of the plurality of operational modes, the control means controls the electric motor to progressively and incrementally change the moving speed of the wiper, from a preset moving speed for the another one of the plurality of operational modes to a preset moving speed for the one of the plurality of operational modes, based on a difference between the preset moving speeds for the one and the another of the plurality of operational modes divided by a predetermined number of swings of the wiper between the upper return position and the lower return position, and within a time period for executing the predetermined number of swings.

2. The wiper system according to claim 1, wherein:
the plurality of operational modes includes first and second operational modes;
the moving speed of the wiper, which is preset for the second operational mode, is higher than the moving speed of the wiper, which is preset for the first operational mode;
when the operational command, which commands execution of the second operational mode, is entered through the entering means in the middle of the operation of the wiper in the first operational mode, the control means controls the electric motor such that the first operational mode is changed to the second operational mode at time of arriving of the wiper at one of the upper return position and the lower return position; and
when the operational command, which commands execution of the first operational mode, is entered through the entering means in the middle of the operation of the wiper in the second operational mode, the control means controls the electric motor such that the second operational mode is changed to the first operational mode during the time period of executing the predetermined number of swings of the wiper between the upper return position and the lower return position upon entering of the operational command, which commands the execution of the first operational mode, through the entering means.

3. The wiper system according to claim 1, wherein:
the plurality of operational modes includes first and second operational modes;
the moving speed of the wiper, which is preset for the second operational mode, is higher than the moving speed of the wiper, which is preset for the first operational mode; and
when the operational command, which commands execution of the second operational mode, is entered through the entering means during the time period of executing the predetermined number of swings of the wiper between the upper return position and the lower return position in the middle of changing of the second operational mode to the first operational mode, the control means controls the electric motor such that the operational mode is changed to the second operational mode at time of arriving of the wiper at one of the upper return position and the lower return position.

4. The wiper system according to claim 1, wherein:
the plurality of operational modes includes first and second operational modes;
the moving speed of the wiper, which is preset for the second operational mode, is higher than the moving speed of the wiper, which is preset for the first operational mode;
the control means controls the electric motor such that the rotational speed of the electric motor is maximized when the wiper passes a center area between the upper return position and the lower return position during each swing of the wiper between the upper return position and the lower return position; and when the operational command, which commands execution of the first operational mode, is entered through the entering means in the middle of the operation of the wiper in the second operational mode, the control means controls the electric motor such that a maximum value of the rotational speed of the wiper of the second operational mode is progressively changed to a maximum value of the rotational speed of the wiper of the first operational mode during the time period of executing the predetermined number of swings of the wiper between the upper return position and the lower return position upon entering of the operational command, which commands the execution of the first operational mode, through the entering means.

5. The wiper system according to claim 1, further comprising a storage means for storing operational mode specific speed information of each of the plurality of operational modes, which indicates the moving speed of the wiper at each of corresponding locations in a movable range of the wiper, wherein the control means controls the electric motor such that the moving speed of the wiper of the another one of the plurality of operational modes, which is indicated in the corresponding operational mode specific speed information, is changed to the moving speed of the wiper of the one of the plurality of operational modes, which is indicated in the corresponding operational mode specific speed information, during the time period of executing the predetermined number of swings of the wiper between the upper return position and the lower return position at the time of changing the another one of the plurality of operational modes to the one of the plurality of operational modes.

6. The wiper system according to claim 1, wherein the control means progressively changes the moving speed of the wiper in an upward swing or a downward swing of the wiper between the upper return position and the lower return position.

7. The wiper system according to claim 1, wherein when the one of the plurality of operational commands is entered through the entering means in the middle of the operation of the wiper in the another one of the plurality of operational modes, the control means controls the electric motor such that the moving speed of the wiper, which is preset for the another one of the plurality of operational modes, is changed to at least one intermediate moving speed, which is between the moving speed of the wiper set for the another one of the plurality of operational modes and the moving speed of the wiper set for the one of the plurality of operational modes, and is then changed to the moving speed of the wiper set for the one of the plurality of operational modes during the time period of executing the predetermined number of swings of the wiper.

8. The wiper system according to claim 1, wherein when the one of the plurality of operational commands is entered through the entering means in the middle of the operation of the wiper in the another one of the plurality of operational modes, the control means controls the electric motor such that the moving speed of the wiper, which is preset for the another one of the plurality of operational modes, is progressively changed at each of the predetermined number of swings of the wiper until the moving speed of the wiper is changed to the moving speed of the wiper, which is preset for the one of the plurality of operational modes during the time period of executing the predetermined number of swings of the wiper.

9. A wiper system comprising:
a wiper that is pivotably supported to swing over a wiping subject surface and thereby to wipe the wiping subject surface;

an electric motor that has an output shaft, which is connected to the wiper to transmit a rotational force of the electric motor to the wiper, wherein the electric motor drives the wiper to execute a reciprocal swing operation of the wiper between an upper return position and a lower return position upon forward and backward rotations of the output shaft;

an entering means for entering one of a plurality of operational commands of the wiper to execute a corresponding one of a plurality of operational modes of the wiper that are preset to implement different moving speeds, respectively, of the wiper; and a control means for controlling the electric motor, wherein when one of the plurality of operational commands, which commands execution of one of the plurality of operational modes, is entered through the entering means in the middle of the operation of the wiper in another one of the plurality of operational modes, the control means controls the electric motor such that the moving speed of the wiper, which is preset for the another one of the plurality of operational modes, is changed to the moving speed of the wiper, which is preset for the one of the plurality of operational modes, during a time period of executing a predetermined number of swings of the wiper between the upper return position and the lower return position upon entering of the one of the plurality of operational commands through the entering means;

a storage means for storing standard speed information, which is common to the plurality of operational modes and indicates a standard moving speed of the wiper at each of corresponding locations in a movable range of the wiper, wherein:

the control means controls the electric motor such that the wiper is moved at a corresponding moving speed that is obtained by multiplying the standard moving speed at the corresponding location by a corresponding one of a plurality of coefficients, which are set for the plurality of operational modes, respectively, and are proportional to the moving speeds of the wiper that are preset for the plurality of operational modes, respectively; and the coefficient, which is set for the another one of the plurality of operational commands, is changed to the coefficient, which is set for the one of the plurality of operational commands, during the time period of executing the predetermined number of swings of the wiper between the upper return position and the lower return position upon entering of the one of the plurality of operational commands through the entering means.

10. The wiper system according to claim 9, wherein the standard moving speed of the wiper at the corresponding location is the moving speed of the wiper, which is preset for a corresponding one of the plurality of operational modes.

11. A wiper control method for controlling a wiper that is pivotably supported to swing over a wiping subject surface and thereby to wipe the wiping subject surface, the wiper control method comprising:
controlling an electric motor, which has an output shaft connected to the wiper to transmit a rotational force of the electric motor to the wiper, such that when one of a plurality of operational commands, which commands execution of one of a plurality of operational modes of the wiper that are preset to implement different moving speeds, respectively, of the wiper, is entered through an entering means in the middle of the operation of the wiper in another one of the plurality of operational modes, the moving speed of the wiper is progressively and incrementally changed from a preset moving speed for the another one of the plurality of operational modes to a preset moving speed for the one of the plurality of operational modes, based on a difference between the preset moving speeds for the one and the another of the plurality of operational modes divided by a predetermined number of swings of the wiper between an upper return position and a lower return position, and within a time period for executing the predetermined number of swings.

12. The wiper control method according to claim 11, wherein the controlling of the electric motor includes controlling the electric motor such that when the one of the plurality of operational commands is entered through the entering means in the middle of the operation of the wiper in the another one of the plurality of operational modes, the moving speed of the wiper, which is preset for the another one of the plurality of operational modes, is changed to at least one intermediate moving speed, which is between the moving speed of the wiper set for the another one of the plurality of operational modes and the moving speed of the wiper set for the one of the plurality of operational modes, and is then changed to the moving speed of the wiper set for the one of the plurality of operational modes during the time period of executing the predetermined number of swings of the wiper.

13. The wiper control method according to claim 11, wherein the controlling of the electric motor includes controlling the electric motor such that when the one of the plurality of operational commands is entered through the entering means in the middle of the operation of the wiper in the another one of the plurality of operational modes, the moving speed of the wiper, which is preset for the another one of the plurality of operational modes, is progressively changed at each of the predetermined number of swings of the wiper until the moving speed of the wiper is changed to the moving speed of the wiper, which is preset for the one of the plurality of operational modes during the time period of executing the predetermined number of swings of the wiper.

\* \* \* \* \*